(12) United States Patent
Lita

(10) Patent No.: US 8,375,127 B1
(45) Date of Patent: Feb. 12, 2013

(54) METHOD AND SYSTEM FOR USING VIRTUAL URLS FOR LOAD BALANCING

(75) Inventor: Christian Lita, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1826 days.

(21) Appl. No.: 09/282,692

(22) Filed: Mar. 31, 1999

(51) Int. Cl.
*G06F 15/173* (2006.01)

(52) U.S. Cl. ........ 709/226; 709/206; 709/223; 709/250; 370/392; 370/389; 370/399

(58) Field of Classification Search .................. 709/203, 709/223, 217, 402, 105, 219, 225–229, 235, 709/206, 250; 370/402, 392, 389, 399; 713/202; 726/6

See application file for complete search history.

(56) References Cited

U.S. PATENT DOCUMENTS

| | | | | |
|---|---|---|---|---|
| 5,303,238 A | * | 4/1994 | Brodd et al. | 370/402 |
| 5,553,242 A | * | 9/1996 | Russell et al. | 709/227 |
| 5,668,958 A | | 9/1997 | Bendert et al. | |
| 5,687,373 A | | 11/1997 | Holmes et al. | |
| 5,708,780 A | * | 1/1998 | Levergood et al. | 709/229 |
| 5,721,908 A | | 2/1998 | Lagarde et al. | |
| 5,740,371 A | * | 4/1998 | Wallis | 709/229 |
| 5,752,027 A | | 5/1998 | Familiar | |
| 5,761,477 A | | 6/1998 | Wahbe et al. | |
| 5,774,660 A | | 6/1998 | Brendel et al. | 395/200.31 |
| 5,774,668 A | | 6/1998 | Choquier et al. | 395/200.53 |
| 5,787,413 A | | 7/1998 | Kauffman et al. | |
| 5,805,829 A | | 9/1998 | Cohen et al. | |
| 5,812,776 A | * | 9/1998 | Gifford | 709/217 |
| 5,815,703 A | | 9/1998 | Copeland et al. | |
| 6,052,718 A | * | 4/2000 | Gifford | 709/219 |
| 6,070,191 A | * | 5/2000 | Narendran et al. | 709/217 |
| 6,092,196 A | * | 7/2000 | Reiche | 726/6 |
| 6,098,093 A | * | 8/2000 | Bayeh et al. | 709/203 |
| 6,170,017 B1 | * | 1/2001 | Dias et al. | 709/235 |
| 6,175,869 B1 | * | 1/2001 | Ahuja et al. | 709/226 |

(Continued)

FOREIGN PATENT DOCUMENTS

| | | |
|---|---|---|
| EP | 0648038 A2 * | 12/1995 |
| JP | 9312674 | 12/1997 |
| WO | WO 98/26359 | 6/1998 |

OTHER PUBLICATIONS

IBM, "Jax, an Application Extractor for Java," Jun. 1998/813, pp. 410131-410133, Research Disclosure.

(Continued)

*Primary Examiner* — Thu Ha Nguyen
(74) *Attorney, Agent, or Firm* — Jeffrey S. LaBaw

(57) ABSTRACT

A method, computer program product and server for use managing connection requests to a pool of servers identified by a given URL. The method begins in response to a connection request from a given client machine that initiates a user session for associating a session identifier with a given server in the pool. The session identifier is then used to generate a "virtual" URL that redirects the connection request to the given server. Thereafter, any additional connection requests issued from the given client machine during the user session are redirected to the given server so that all content is served to the client from the same location. When the user session terminates, the virtual URL is inactivated and the given server is returned to the pool so that it can then be assigned a new user session to manage.

18 Claims, 3 Drawing Sheets

U.S. PATENT DOCUMENTS

| | | | | |
|---|---|---|---|---|
| 6,185,601 | B1* | 2/2001 | Wolff | 709/203 |
| 6,360,270 | B1* | 3/2002 | Cherkasova et al. | 709/229 |
| 7,080,158 | B1* | 7/2006 | Squire | 709/245 |
| 7,155,539 | B2* | 12/2006 | Vange et al. | 709/250 |
| 7,246,230 | B2* | 7/2007 | Stanko | 713/155 |
| 2001/0037469 | A1* | 11/2001 | Gupta et al. | 713/202 |
| 2002/0029269 | A1* | 3/2002 | McCarty et al. | 709/225 |
| 2002/0169961 | A1* | 11/2002 | Giles et al. | 713/175 |
| 2008/0228919 | A1* | 9/2008 | Doshi et al. | 709/226 |
| 2010/0042735 | A1* | 2/2010 | Blinn et al. | 709/229 |

OTHER PUBLICATIONS

IBM, "Method for Converting The CallPath Architecture to the JTAPI Architecture," Jun. 1998/818, pp. 410134-410136, Research Disclosure.

IBM, "Controlling the 3270 Server Function from a Client," Jul. 1998/996, pp. 411121-411122, Research Disclosure.

IBM Technical Disclosure Bulletin, "System for Running Unchanged Java Sockets Applications on Non-Internet Protocol Networks or on Higher-Function Internal Protocol Networks," Jul. 1997, vol. 40, No. 07.

Nikkei Internet Technology, No. 13, pp. 154-155, Aug. 1998.

Nikkei Communications, No. 289, p. 90, Mar. 1999.

Iyengar, "Dynamic Argument Embedding: Preserving State on the World Wide Web", *IEEE Internet Computing*, pp. 50-56, Mar./Apr. 1997.

Mourad et al., "Scalable Web Server Architectures", *Proc. of IEEE Intl. Symposium on Computers and Communications*, pp. 12-16, Jul. 1997.

\* cited by examiner

METHOD AND SYSTEM FOR USING VIRTUAL URLS FOR LOAD BALANCING

BACKGROUND OF THE INVENTION

1. Technical Field

This invention relates generally to information retrieval in a computer network. More particularly, the invention relates to a method and system for balancing HTTP requests to a set of servers on a per-session as opposed to per-connection basis.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and, in return, receives in return a document or other object formatted according to HTML. A collection of documents supported on a Web server is sometimes referred to as a Web site.

At many popular Web sites, the capacity demand is much greater than can be served by one server. Thus, it is known in the art to mirror a Web site and to incorporate a load balancing routine to distribute connection requests across a pool of servers. Typically, such load balancing is carried out in a round-robin fashion. Each server preferably includes the same data, so any request can be handled by any of the multiple servers in the pool. This distributes the load in an even manner.

While such known load balancing schemes are advantageous, certain types of Web server transactions are not conducive to load balancing in this manner. Thus, for example, assume that the Web site is a financial institution or bank. Typically, a user accesses such a site to effect a set of one or more transactions, e.g., an account balance inquiry, a transfer of funds between a set of pair of accounts, and the like. When this type of site is mirrored for load balancing purposes, there is a likelihood that the user's HTTP requests will be serviced by different servers in the server pool. This is undesirable, and it may force the user to have to log-in repeatedly to complete all of the transactions required. Similar problems are encountered in mirrored sites that offer electronic commerce transactions.

This problem arises because prior art load balancing techniques operate on a per-connection basis. Thus, if a given server handling an HTTP request suddenly becomes overloaded due to an excessive number of connections, the load balancing routine automatically delivers a next connection request to another server in the pool, even if the request originates from the same client machine.

The present invention addresses this problem.

BRIEF SUMMARY OF THE INVENTION

It is a primary object of this invention to provide a method for equitably distributing client requests across a set of servers on a per-session basis. Preferably, a given server in the set is allocated a given number of sessions, as opposed to a given number of connections, and thus a user's HTTP connection requests are preferably serviced from the same server in the set throughout the session.

It is another primary object of this invention to implement a load balancing routine across a set of servers wherein given connection requests originating from a client machine are serviced from the same server in the set.

A still further object of the present invention is to manage HTTP connection requests from a client machine using a so-called virtual URL that defines a user session. The client is then notified that that the requested URL has been moved to a specific server.

Yet another object of the present invention is to balance connection requests to a pool of servers on a session basis so that each server has a predefined number of users that may obtain access to documents supported on that server.

It is still another object of this invention to redirect HTTP connection requests originating from a user of a given client machine to a specific server during a session.

These and other objects of the invention are provided in a method, computer program product and server for use managing connection requests to a pool of servers identified by a given URL. In one embodiment, the method begins in response to a connection request from a given client machine that initiates a user session. In response to the request, the method associates a session identifier with a given server in the pool. The session identifier is then used to generate a "virtual" URL that redirects the connection request to the given server. Thereafter, any additional connection requests issued from the given client machine during the user session are redirected to the given server so that all content is served to the client from the same location. When the user session terminates, the virtual URL is inactivated and the given server is returned to the pool so that it can then be assigned a new user session to manage.

Thus, according to the invention, a method for managing connection requests to a pool of servers is responsive to connection requests from client machines that initiate user sessions for associating each user session originating from a client machine with a given server in the pool. User sessions are associated with the servers in the pool in accordance with a load balancing protocol. During each user session, any additional connection requests originating from a given client machine are then redirected to the server that is managing the session. The user session is associated with a given server by generating a virtual URL that includes a unique session identifier, which identifier is then provided with all data returned from the server to the client machine. The virtual URL is inactivated upon completion of the user session.

The invention also describes a server for managing a pool of servers at a Web site identified by a given URL. The server comprises a processor, an operating system, a load balancing routine, and a redirector routine for managing HTTP connection requests to the Web site. The redirector routine is a front end process that runs in the server and includes means responsive to connection requests from client machines that initiate user sessions for associating each user session originating from a client machine with a given server through a unique session identifier. During each user session, connection requests originating from the client machine to the given URL are redirected to the given server.

The foregoing has outlined some of the more pertinent objects and features of the present invention. These objects should be construed to be merely illustrative of some of the more prominent features and applications of the invention.

Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
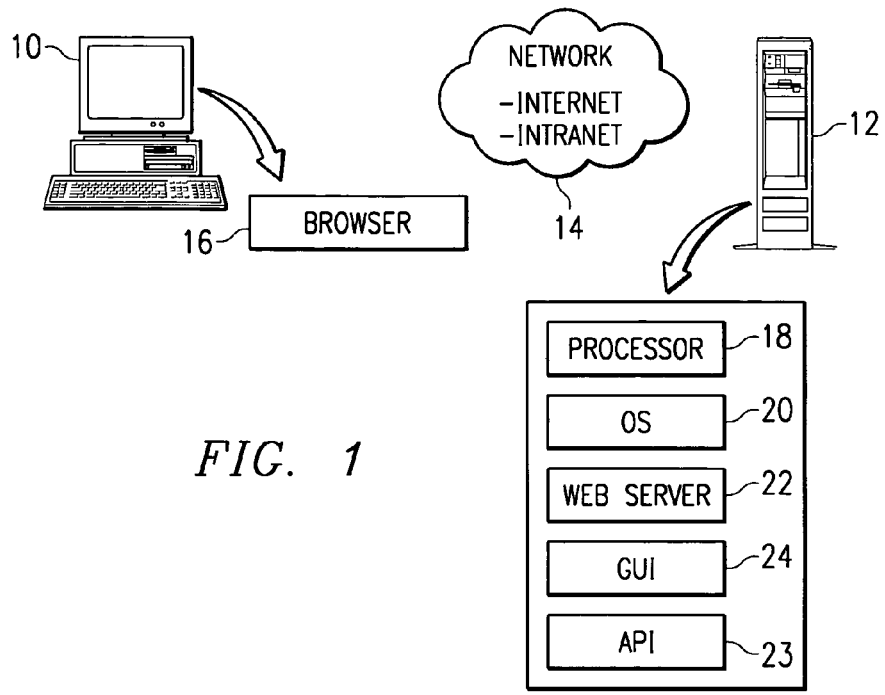
FIG. 1 is a representative system in which the present invention is implemented.

A known Internet client-server system is implemented is illustrated in FIG. 1. A client machine 10 is connected to a Web server 12 via network 14. For illustrative purposes, network 14 is the Internet, an intranet, an extranet or any other known network. Web server 12 is one of a plurality of servers which are accessible by clients, one of which is illustrated by machine 10. A representative client machine includes a browser 16, which is a known software tool used to access the servers of the network. The Web server supports files (collectively referred to as a "Web" site) in the form of hypertext documents and objects. In the Internet paradigm, a network path to a server is identified by a so-called Uniform Resource Locator (URL).

A representative Web server 12 is an IBM Netfinity server comprising a RISC-based processor 18, the AIX® operating system 20 and a Web server program 22, such as Netscape Enterprise Server. The server 12 also includes a display 24 supporting a graphical user interface (GUI) for management and administration, and an Application Programming Interface (API) 23 that provides extensions to enable application developers to extend and/or customize the core functionality thereof through software programs including Common Gateway Interface (CGI) programs, plug-ins, serviettes, active server pages, server side include (SSI) functions or the like.

A representative Web client is a personal computer that is x86-, PowerPC®- or RISC-based, that includes an operating system such as IBM® OS/2® or Microsoft Windows '95, and that includes a Web browser, such as Netscape Navigator 4.0 (or higher), having a Java Virtual Machine (JVM) and support for application plug-ins or helper applications.

Figure 2:
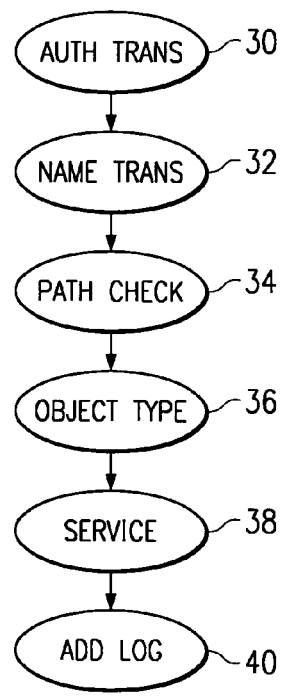
FIG. 2 is a flowchart illustrating the conventional processing associated with an HTTP request from the Web client to the Web server shown in FIG. 1.

The Web server accepts a client request and returns a response. The operation of the server program 22 is governed by a number of server application functions (SAFs), each of which is configured to execute in a certain step of a sequence. This sequence, illustrated in FIG. 2 by way of background only, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.) for the given document is identified. At step 38, called Service (Service), the Web server routine selects an internal server function to send the result back to the client. This function can run the normal server service routine (to return a file), some other server function (such as a program to return a custom document) or a CGI program. At step 40, called Add Log (AddLog), information about the transaction is recorded.

Figure 3:
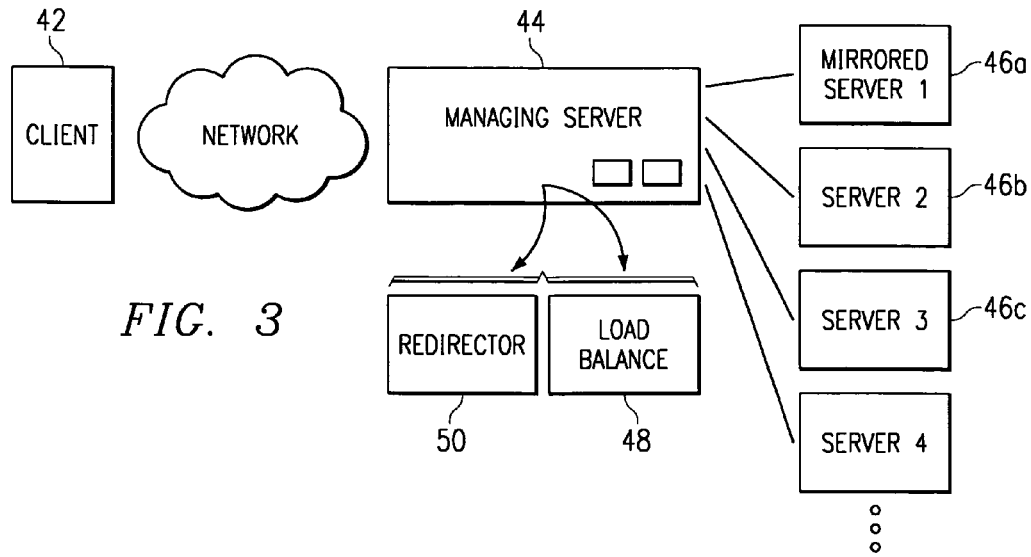
FIG. 3 is a block diagram of a client machine connecting to a Web site comprising a server pool.

FIG. 3 is a block diagram illustrating the environment in which the present invention is implemented. In this illustration, client machine 42 makes HTTP requests to a Web site comprising a managing server 44, and a set of mirrored servers 46a-46n managed by the managing server. Managing server 44 may comprise one of the mirrored servers. Managing server 44 includes a load balancing routine 48 for keeping track of the load on each of the mirrored servers and for directing service requests to the servers according to a load balancing algorithm. According to the present invention, the managing server further includes a redirector routine 50 that provides the enhanced functionality of the present invention.

As will be seen, redirector routine 50 acts as a front end process for parsing client requests and for determining whether a given request represents the beginning or end of a "session." As used herein, a session represents a set of connection-less transactions between a given user (at a client machine) and the Web site. For example, if the managing server is a bank Web site, the session involves a set of queries to the server from the user, together with the responses served from the servers. In this example, a user logs in and is recognized as being authorized to access given information (e.g., a bank account balance). According to the present invention, the redirector enables all of requests originating from the client machine to the site, and all of the information delivered to the client machine, to be served to and from the same server during a given "session." One of ordinary skill in the art will thus appreciate that this enables the load to be balanced on a per-session basis, as opposed to a per-connection basis as in the prior art.

Figure 4:
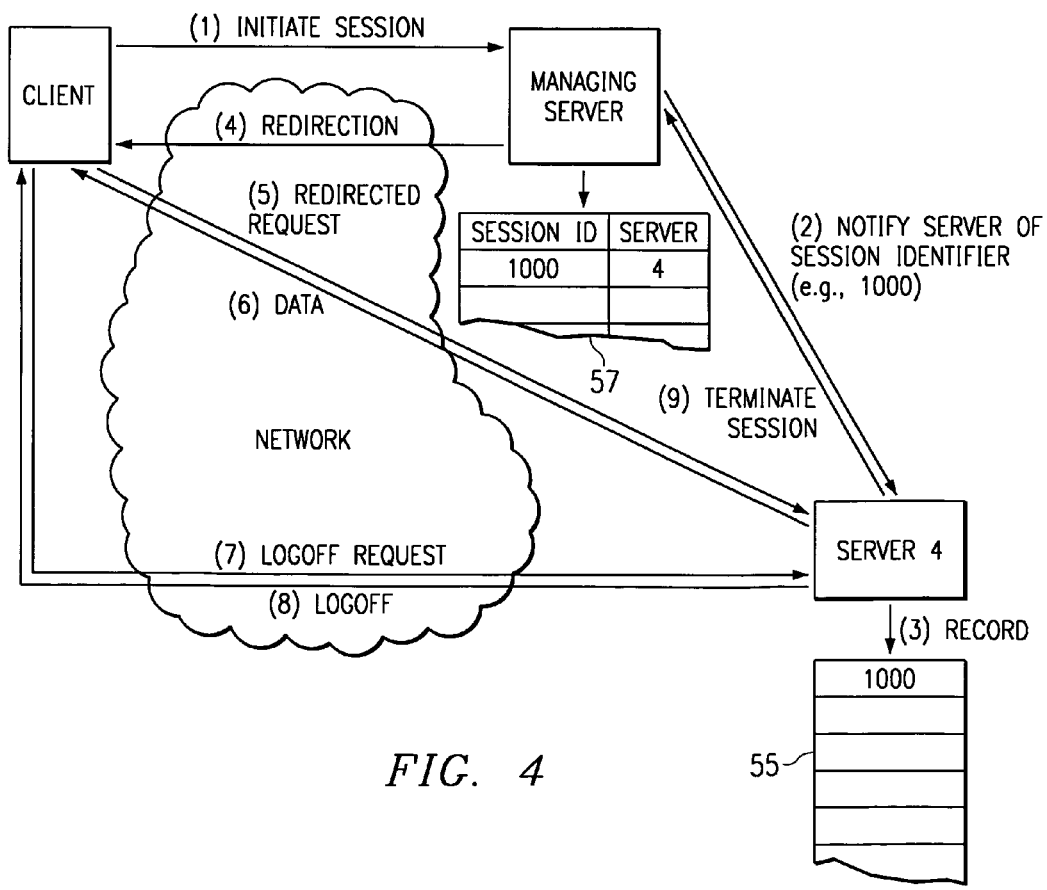
FIG. 4 is a state diagram illustrating the inventive functionality of the redirector routine.
Figure 5:
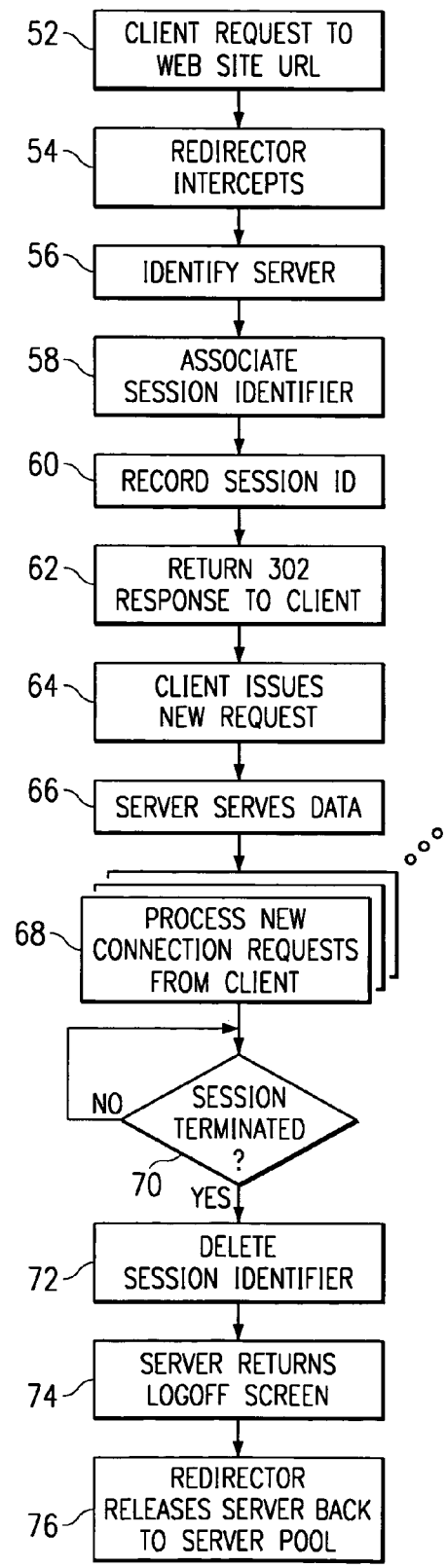
FIG. 5 is a flowchart illustrating the function of the redirector routine.

This operation is now described with respect to the state diagram of FIG. 4, together with the flowchart of FIG. 5. Sequential steps are numbered in the state diagram. The routine begins at step 52 with the client making a request to initiate a session. Typically, this is a login request, which may occur, for example, by having the user access the Web site (through its URL) and then enter information into a CGI-based form. This is a conventional login transaction over the Internet. Returning to the flowchart, in step 52, the client machine thus issues an HTTP request (for example, http://www.bank.com/login.html) to the managing server. At step 54, the redirector intercepts the request and recognizes that the user has requested the initiation of a session. Following (optional) entry and validation of a userid and password, the routine continues at step 56, wherein the redirector queries the load balancing routine to determine which of the servers in the set will service the session. This outcome of this test depends on the particular load balancing algorithm being implemented. As noted above, the present invention enables HTTP connection requests and associated server responses to be managing through one server of the set throughout the entire session.

At step 58, the redirector associates a session identifier with the session and then notifies the server (in this example, server S4) that has been selected to manage the session of the session identifier. Preferably, the session identifier is a unique number (e.g., an increasing sequential number). At step 60, server S4 records the session identifier in a session table 55. Each server in the server pool preferably has an associated session table 55 for storing session identifiers of the sessions being managed by that server. The redirector likewise includes an appropriate data structure 57 maintaining information about which server is managing which session. At step 62, the redirector returns an appropriate redirection response (e.g., "302: URL has moved") to the client. This response also identifies the URL of the server and includes the session identifier, e.g.: "http://server 4 URL/session identifier/login.html. This is sometimes referred to herein as a "virtual" URL. This completes the redirection function.

The client then continues at step 64 by issuing a new HTTP connection request, using the URL passed from the managing server during step 62. This redirection process is typically an automatic function carried out by the browser in response to the 302 response. The routine then continues at step 66 with the server S4 serving the requested data. All data returned to the client contains the session identifier as part of the URL base. Throughout the remainder of the session, all HTTP connection requests from this particular client machine are managed through server S4. This is illustrated at step 68 in the flowchart.

A test is performed repeatedly at step 70 to determine whether the session is to be terminated. Typically, this request is identified by the redirector because the user has taken some action that generates a given logoff request. Thus, for example, the redirector has parsed the input HTML stream and recognized the following request: "http://server 4 URL/session identifier/logoff.html". At this point in the routine, namely, at step 72, the server S4 deletes the session identifier from the session table 55 and performs the requested logoff action. Deletion of the session identifier is sometimes referred to as "inactivating" the identifier because, once the session identifier is removed from the table, the client machine is no longer explicitly coupled to the server that, up until that time, had been handling the connection requests originating from that machine during the user session.

The routine then continues at step 74 to return a logoff screen to the client machine. The server then notifies the redirector that the user associated with the session identifier has logged off. At step 76, the redirector releases the server S4 from the session, thus making the server available to handle a new session from another user.

Thus, the redirector maintains a running count of the number of sessions being managed by each server in the pool, as well as the identification of the actual session identifiers being managed at each server. As a user completes his or her session, the server that has been managing the session becomes available to the redirector (and, thus, the load balancing routine) to service another set of connection requests from another user. Thus, load balancing is achieved on a per-session, as opposed to a per-connection, basis. This provides significant advantages over the prior art.

In particular, a given user may now undertake a set of transactions and be assured that all such transactions are managed by the same server. By implementing the redirection function, the user is assured that he or she may carry out a set of transactions without having to login repeatedly to the server. This is quite advantageous as the transactions are connection requests that are communicated in a connectionless (i.e. a "stateless") operating environment. By adding the virtual URL to the redirection request, the target server has the capability to count actual user sessions and thus impose an upper limit of users instead of connections. Another benefit is that if the user cannot bookmark a page in the middle of a session because the virtual URL is short-lived (i.e. it only lasts as long as the session lasts). This ensures that the user is forced to back to the beginning URL to begin a new session, thus preventing restarts in the middle of a particular session. The redirector provides a consistent session flow.

The above-described functionality preferably is implemented in software running on the managing server. There is no requirement to modify the client-side software as the redirection to the virtual URL takes place automatically. The redirector thus may be plug-in enabled code, preferably a Java servlet. The functionality thus is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described my invention, what I claim as new and desire to secure by Letters Patent is set forth in the following claims.

The invention claimed is:

1. A method for managing connection requests to a pool of servers identified by a given URL, comprising the steps of:
   in response to a connection request from a given client machine that initiates a session, associating a session identifier with a given server in the pool;
   using the session identifier in a redirection response;
   returning the redirection response to the given client to redirect the connection request to the given server; and
   during the session, receiving at the given server any additional connection requests from the given client machine.

2. The method as described in claim 1 wherein the step of using the session identifier includes generating a virtual URL.

3. The method as described in claim 2 wherein the virtual URL comprises a URL in the connection request modified to include the session identifier.

4. The method as described in claim 1 wherein the session identifier is incorporated in data returned from the given server to the client machine.

5. The method as described in claim 1 further including the step of: in response to a connection request from the given client machine that terminates the session, inactivating the session identifier.

6. The method as described in claim 1 wherein the given client machine include a browser.

7. The method as described in claim 1 wherein each of the servers in the pool supports a similar set of objects.

8. The method as described in claim 1 wherein the session identifier is associated with a given server as a function of a load balancing protocol.

9. A method for managing connection requests to a pool of servers, comprising the steps of:
  responsive to a connection request from a client machine to initiate a user session, associating a user session originating from a client machine with a given server in the pool in accordance with a load balancing protocol;
  returning a redirection response to the client machine for the connection request; and
  during the user session, receiving at the given server any additional connection requests originating from the client machine
  generating a virtual URL by modifying a given URL to include a session identifier;
  using the virtual URL to redirect the connection request to the given server.

10. The method as described in claim 9 further including the steps of: inactivating the virtual URL upon completion of the user session.

11. The method as described in claim 9 wherein all data returned from given server to the client machine includes the session identifier.

12. The method as described in claim 9 wherein each of the servers in the pool supports a similar set of given projects.

13. The method as described in claim 9 wherein each client machine include a Web browser.

14. A computer program product stores a computer-readable storage memory for managing connection requests to a pool of servers, comprising the steps of:
  means, responsive to a connection request from a client machine to initiate a user session, for associating a user session originating from a client machine with a given server in the pool in accordance with a load balancing protocol;
  means for returning a redirection response to the client machine for the connection request;
  means operative during the user session for receiving at the given server any additional connection requests originating from the client machine;
  means for generating a virtual URL by modifying a given URL to include a session identifier;
  means for redirecting a given connection request to the given server using the virtual URL.

15. The computer program product as described in claim 14 further including: means for inactivating the virtual URL upon completion of the user session.

16. A server for managing a pool of servers at a Web site identified by a given URL, comprising:
  a processor;
  an operating system;
  a load balancing routine; and
  a redirector routine for managing HTTP connection requests to the Web site, comprising:
  means responsive to a connection request from a client machine to initiate a user session for associating a user session originating from a client machine with a given server in the pool in accordance with the load balancing routine;
  means for returning a redirection response to the client machine for the connection request; and
  means operative during the user session for redirecting to the given server any additional connection requests originating from the client machine;
  means for generating a virtual URL by modifying a given URL to include a session identifier; means for redirecting a given connection request to the given server using the virtual URL.

17. The server as described in claim 16 wherein the redirector further includes: means for inactivating the virtual URL upon completion of the user session.

18. A method of managing a pool of servers at a Web site identified by a given URL, comprising the steps of:
  in response to a connection request containing the given URL form a given client machine that initiates a session, associating a session identifier with a given server in the pool of servers;
  generating a virtual URL by modifying the given URL from the connection request to include the session identifier;
  generating a redirection response comprising the virtual URL; and
  sending the redirection response to the given client machine to redirect the connection request to the given server.

* * * * *